US009998299B2

(12) United States Patent
Herrero

(10) Patent No.: US 9,998,299 B2
(45) Date of Patent: Jun. 12, 2018

(54) EFFICIENT TRANSPORT OF ENCAPSULATED MEDIA TRAFFIC OVER RESTRICTIVE NETWORKS

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 119 days.

(21) Appl. No.: 15/214,958

(22) Filed: Jul. 20, 2016

(65) Prior Publication Data

US 2018/0026811 A1 Jan. 25, 2018

(51) Int. Cl.
*H04L 12/46* (2006.01)
*H04L 12/911* (2013.01)
*H04L 29/12* (2006.01)
*H04L 29/06* (2006.01)

(52) U.S. Cl.
CPC ........ *H04L 12/4633* (2013.01); *H04L 47/825* (2013.01); *H04L 61/2007* (2013.01); *H04L 63/029* (2013.01); *H04L 69/165* (2013.01); *H04L 69/169* (2013.01); *H04L 2212/00* (2013.01)

(58) Field of Classification Search
CPC ... H04L 65/608; H04L 67/42; H04L 12/4633; H04L 69/16; H04W 12/02
USPC .......................................................... 370/352
See application file for complete search history.

(56) References Cited

U.S. PATENT DOCUMENTS

| 8,855,143 | B1* | 10/2014 | Acampora | .......... | H04L 63/1458 370/477 |
| 9,332,049 | B1 | 5/2016 | Herrero | | |
| 9,397,857 | B2* | 7/2016 | Gross, IV | ............... | H04L 47/31 |
| 2005/0053034 | A1* | 3/2005 | Chiueh | ................. | H04W 36/14 370/331 |
| 2007/0098006 | A1* | 5/2007 | Parry | .................. | H04L 12/4633 370/437 |
| 2008/0271137 | A1* | 10/2008 | Sinn | .................... | H04L 12/4633 726/15 |

(Continued)

FOREIGN PATENT DOCUMENTS

EP 2908491 A1 8/2015

OTHER PUBLICATIONS

H. Schulzrinne et al.; "RTP: A Transport Protocol for Real-Time Applications";Jul. 2003; 89 pages.

(Continued)

*Primary Examiner* — Roberta Lopata
(74) *Attorney, Agent, or Firm* — Potomac Law Group, PLLC

(57) ABSTRACT

A system that transmits encapsulated media receives a first request to establish a tunnel with a stream based transport layer, the first request including a tag. The system receives a second request to establish the tunnel with a datagram based transport layer, the second request including the tag. The system establishes the tunnel with the stream based transport layer and receives the encapsulated media over the stream based transport layer. The system establishes the datagram based transport layer for the tunnel in addition to the stream based transport layer and receives the encapsulated media over the datagram based transport layer. The system then releases the stream based transport layer.

20 Claims, 5 Drawing Sheets

(56) References Cited

U.S. PATENT DOCUMENTS

| | | | |
|---|---|---|---|
| 2013/0283037 A1* | 10/2013 | Katz | H04L 63/04 |
| | | | 713/151 |
| 2014/0376558 A1* | 12/2014 | Rao | H04L 47/2441 |
| | | | 370/401 |
| 2014/0379931 A1 | 12/2014 | Gaviria | |
| 2015/0039687 A1 | 2/2015 | Waxman et al. | |
| 2016/0112372 A1* | 4/2016 | Katz | H04L 63/029 |
| | | | 726/15 |
| 2016/0261558 A1* | 9/2016 | Herrero | H04L 65/60 |
| 2016/0261559 A1* | 9/2016 | Herrero | H04L 65/60 |
| 2016/0285823 A1* | 9/2016 | Herrero | H04L 63/0272 |
| 2016/0365989 A1 | 12/2016 | Herrero | |
| 2017/0078359 A1* | 3/2017 | Herrero | H04L 65/608 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

F. Wang et al.; "CloudJet4BigData: Streamlining Big Data via an accelerated socket interface"; the IEEE 3rd International Congress on big data (BigData 2014); Alaska; USA; Jun. 27-Jul. 2, 2014.

C. Mattmann et al.; "A Classification and Evaluation of Data Movement Technologies for the Delivery of Highly Voluminous Scientific Data Products"; Jet Propulsion Laboratory; California Institute of Technology; May 25, 2006.

\* cited by examiner

EFFICIENT TRANSPORT OF ENCAPSULATED MEDIA TRAFFIC OVER RESTRICTIVE NETWORKS

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that transmits encapsulated media. The system receives a first request to establish a tunnel with a stream based transport layer, the first request including a tag. The system receives a second request to establish the tunnel with a datagram based transport layer, the second request including the tag. The system establishes the tunnel with the stream based transport layer and receives the encapsulated media over the stream based transport layer. The system establishes the datagram based transport layer for the tunnel in addition to the stream based transport layer and receives the encapsulated media over the datagram based transport layer. The system then releases the stream based transport layer.

DETAILED DESCRIPTION

One embodiment transmits encapsulated media over a tunnel by requesting, near simultaneously through consecutive requests, two transport layers at tunnel/call setup time. One of the transport layers in one embodiment is Transmission Control Protocol ("TCP") and one of the transport layers is User Datagram Protocol ("UDP"), which accommodates encapsulated media traffic. The tunnel is able to transport the encapsulated media traffic over a restrictive communication network that includes a firewall, which typically would block the transmission of UDP data. As a result, the setup time for a call or other communication session that transmits encapsulated media is reduced.

Figure 1:
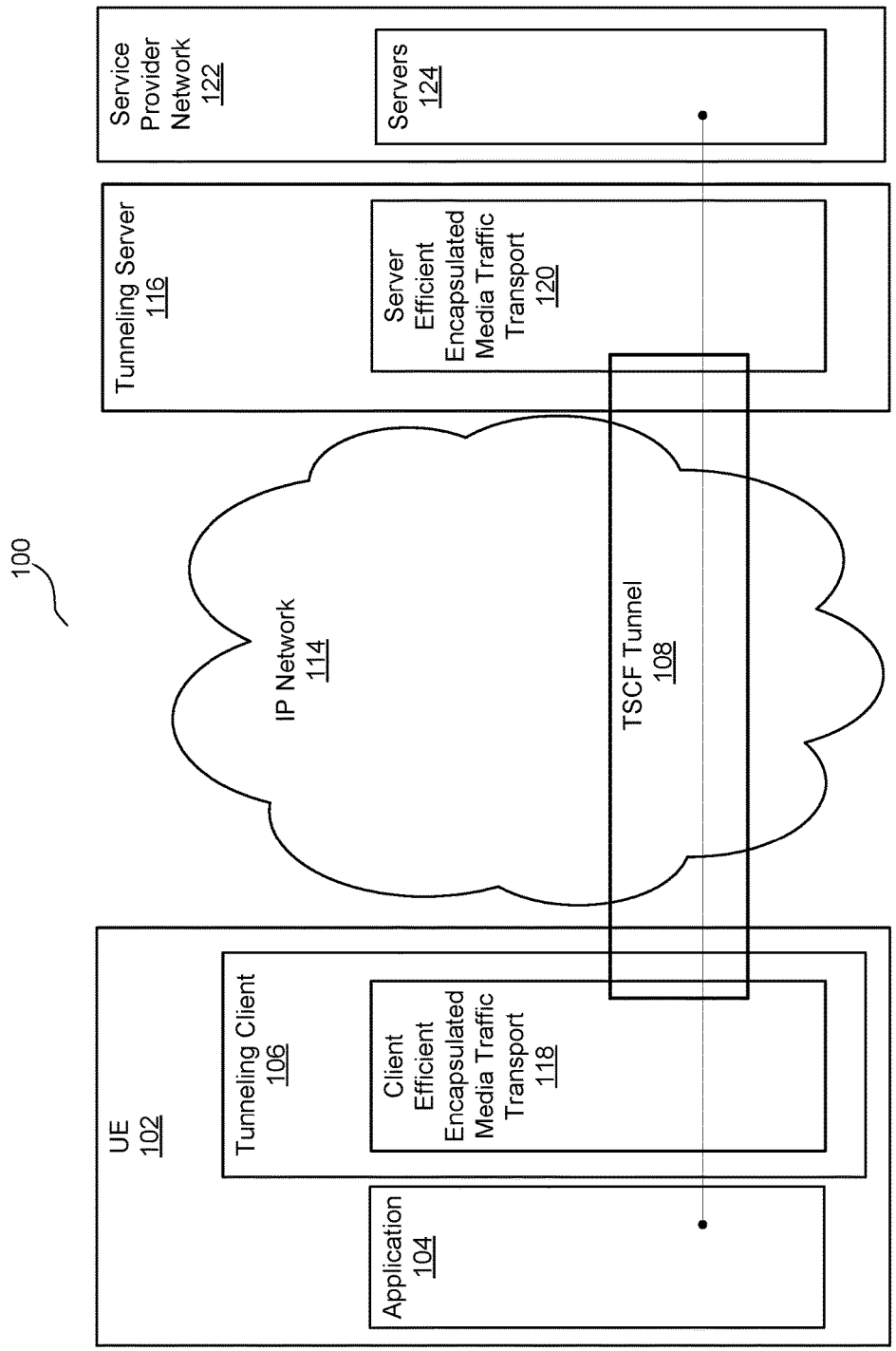
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered, and error-checked delivery of the inner layer traffic, but introduce undesirable latency that is detrimental to RTC applications over a communication network that experiences impairments. On the other hand, UDP and DTLS do not guarantee reliable delivery, thus minimizing latency and being desirable for RTC.

In some embodiments, IP network 114 may be a restrictive network in that it may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client efficient encapsulated media traffic transport module 118 and/or a server efficient encapsulated media traffic transport module 120.

For some applications that transmit encapsulated media data (e.g., voice call data traffic) in the form of UDP traffic, the data may need to traverse a firewall that would normally prevent the traversal of UDP traffic. Therefore, in general, for the functionality of tunnel 108, client efficient encapsulated media traffic transport module 118 and/or server efficient encapsulated media traffic transport module 120 near simultaneously requests consecutively, without any intervening requests in one embodiment, both TCP and UDP transport layers when initiating tunnel 108. The SDKs in general provide additional APIs beyond "standard" TSCF APIs in order to implement the functionality disclosed herein.

One embodiment provides TSCF SDKs that support an application programming interface ("API") so that application 104 can enable the efficient media traffic transport functionality. The TSCF SDK provides a Berkeley software distribution ("BSD")-like socket API that can be used to send and receive encapsulated media using the tsc_sendto and tsc_recvfrom functions, respectively.

Figure 2:
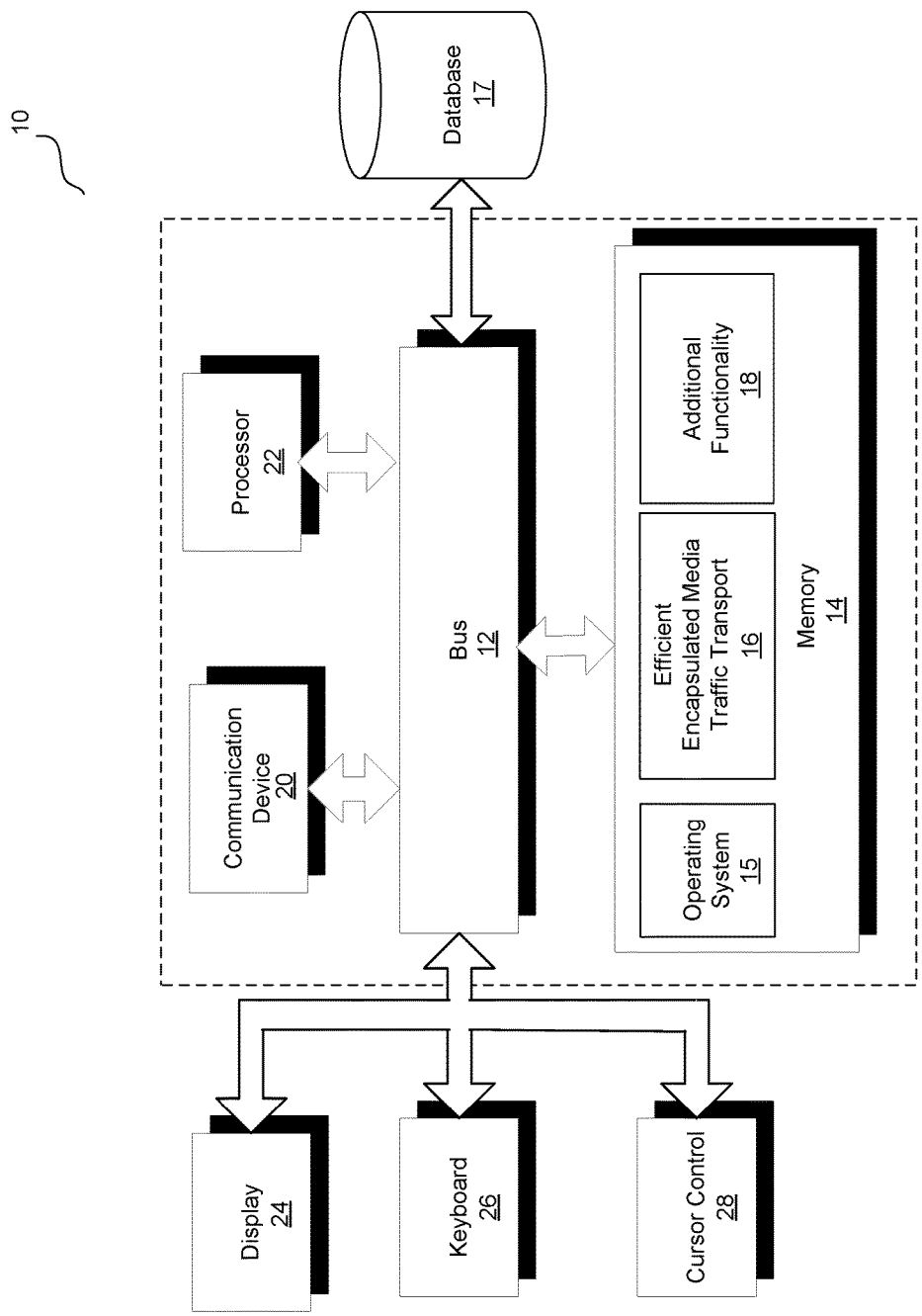
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include an efficient encapsulated media traffic transport module 16 for efficiently transporting encapsulated media traffic through a restrictive firewall, and all other functionality disclosed herein. In one example embodiment, efficient media traffic transport module 16 may implement tunneling server 116 of FIG. 1 or tunneling client 106 in conjunction with one or more remaining elements of FIG. 2. System 10 can be part of a larger system, such as added functionality to the "Acme Packet 6300" session border controller from Oracle Corp. Therefore, system 10 can include one or more additional functional modules 18 to include the additional functionality. A database 17 is coupled to bus 12 to provide centralized storage for redundant encoding module 16 and additional functional modules 18.

Figure 3:
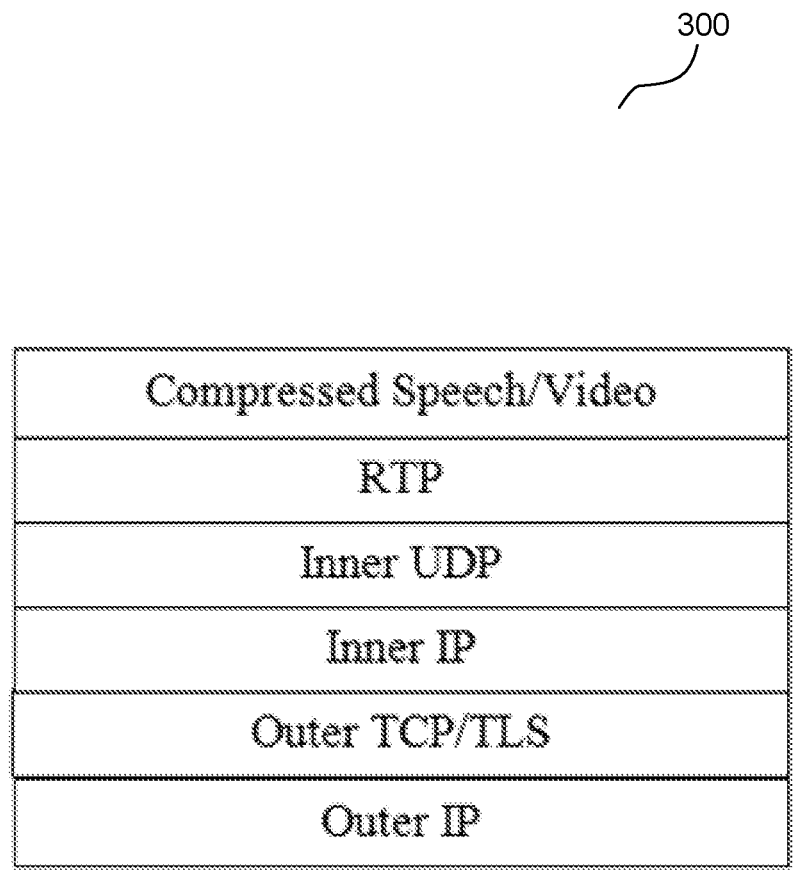
FIG. 3 illustrates example protocol layers in a Tunneled Services Control Function tunneling configuration for encapsulating media traffic according to an embodiment.

In a tunneling configuration, encapsulated (i.e., in a packet/frame) media is typically communicated according to the real-time transport protocol ("RTP" as provided, for example, in IETF RFC 3550). In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

Referring again to FIG. 1, in general, firewalls put restrictions on the type of traffic that can traverse access networks. Specifically, firewalls typically allow stream (i.e., TCP) traffic because it is needed for reliable web browsing protocols such as Hypertext Transfer Protocol ("HTTP") but very often prevent datagram (i.e., UDP) traffic from traversing as it is deemed unreliable for data. One solution is to encapsulate the media traffic so that it can pass as TCP traffic. However, when encapsulated media is involved, TCP transport introduces a potentially much higher latency than UDP, thus degrading the overall user experience.

Because datagram tunneling is typically preferred over stream tunneling, one possible tunnel creation solution involves using datagram transport and only use stream transport if datagram based tunnel negotiation fails. This failure, however, ultimately delays tunnel creation and dramatically increases a communication session (e.g., a telephone call) setup time. In contrast, embodiments implement multiple tunnel transport layers negotiations near simultaneously using consecutive requests, and transparently expedited, in order to minimize setup time, thus guaranteeing that datagram transport is used whenever possible.

In one embodiment, tunneling server 116 is configured with at least two tunnel server interfaces of different types: (1) a stream based interface (i.e., TCP/TLS) and (2) a datagram based interface (i.e., UDP/DTLS). In one embodiment, upon tunnel initialization, tunneling client 116 near simultaneously creates multiple transports, or as many as available tunnel server interfaces.

In one embodiment, tunneling client 106 negotiates a tunnel over every single transport layer by transmitting multiple configuration request CMs. Each configuration request CM includes a new TLV or tag with a unique identifier for all of these requests. In response, tunneling server 116 responds with a configuration response CM that assigns the same tunnel identifier ("TID") and internal IP address to all the incoming requests that reached tunneling server 116. Because the same TID is provided for each request, in general a single tunnel is created that may include multiple transport layers (e.g., a TCP and UDP transport layer). However, ultimately only one transport layer is used in one embodiment as the remaining transport layers are dropped.

In one embodiment, tunneling client 106 processes all configuration responses and starts transmitting as well as receiving encapsulated data in the transport of the very first received configuration response CM. As soon as a configuration response CM is received on a UDP based transport, it becomes the default transport of the tunnel and all other transports are removed. In one embodiment, after a given timeout, if no configuration response CM is received on a UDP based transport, the very first TCP based transport for which a response was received becomes the default one and all other transports are removed.

In one embodiment, the tunnel creation API present in the TSCF SDK includes a new flag to enable the functionality disclosed herein.

Figure 4:
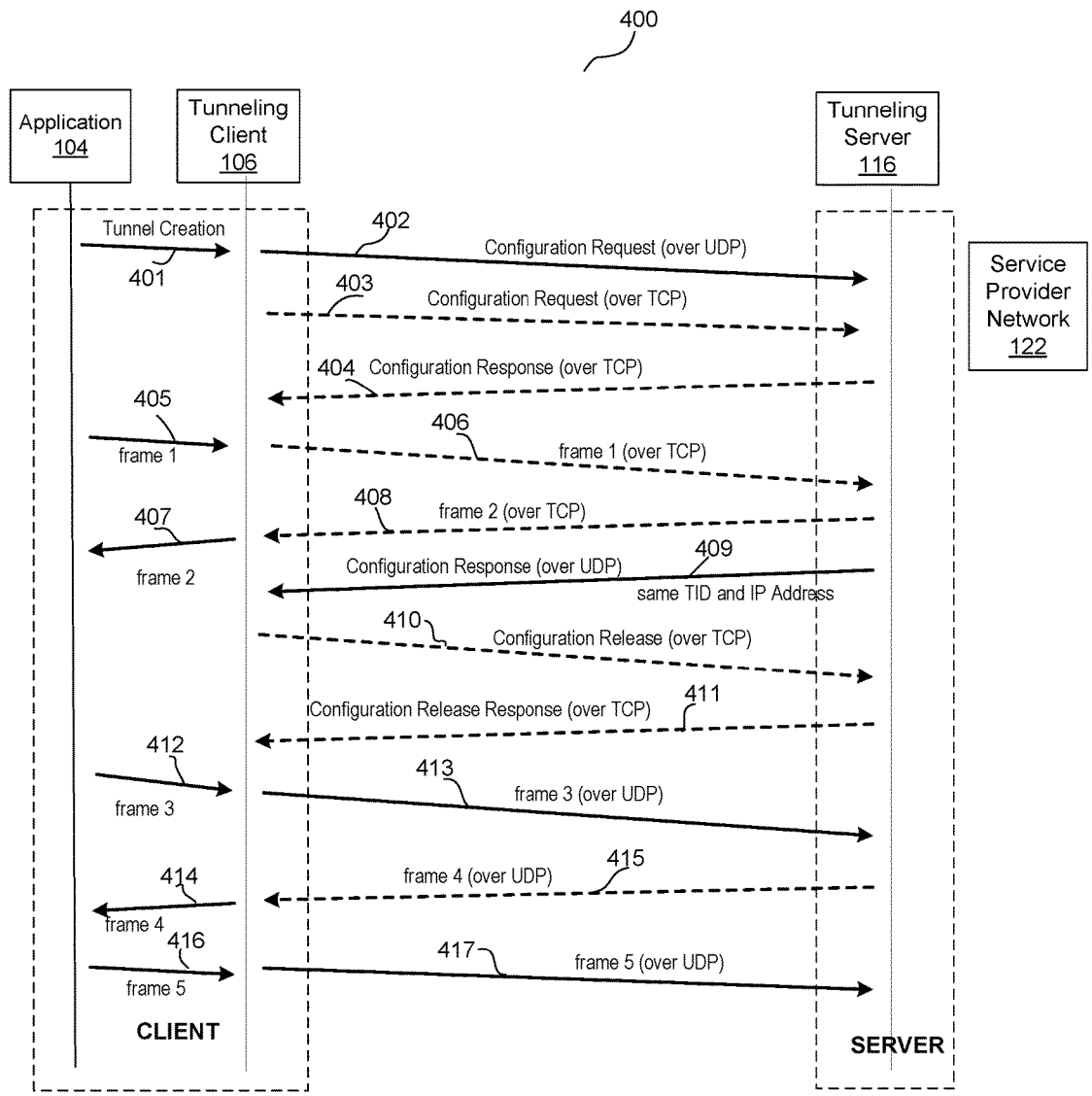
FIG. 4 includes network elements such as a tunneling client in communication with an application, and a tunneling server in communication with a service provider network, as described herein with reference to FIG. 1.

FIG. 4 is an example message sequence diagram 400, including the sequence of messages exchanged between application 104, tunneling client 106 and tunneling server 116 of FIG. 1, for efficient encapsulated media traffic transport according to some embodiments. FIG. 4 includes network elements such as tunneling client 106 in communication with application 104, and tunneling server 116 in communication with service provider network 122, as described herein with reference to FIG. 1.

At 401, application 104 establishes a TSCF tunnel 108 by executing a "tsc_ctrl_new_tunnel" API. Internally, tunneling client 106 creates two transports: a stream based (e.g., TCP/TLS) and a datagram based (e.g., UDP/DTLS) transport.

At 402 and 403, tunneling client 106 sends out a tunnel configuration request CM over each transport type (i.e., UDP at 402 and TCP at 403). In one embodiment, each configuration request CM includes the same "tag" TLV value, described in detail below. The requests at 402, 403 are sent out near simultaneously in one embodiment in that requests 402 and 403 are sent out consecutively without any other intervening requests.

When tunneling server 116 receives the stream based configuration request CM at 403, it assigns a TID and IP address and associates it to the incoming tag. At 404, tunneling server 116 then sends back a configuration response CM including the TID and IP address.

Tunneling client 106 then changes the state of tunnel 108 to "established" and all incoming and outgoing traffic, at this stage when only TCP transport is established, is sent over TCP transport (e.g., frames 1 and 2 at 405-408).

When tunneling server 116 processes the configuration request CM that arrives over the datagram transport at 402, it issues a configuration response CM at 409 that includes the same TID and IP address at 404 as it is associated to the same tag. Therefore, the same tunnel is used with multiple transport layers.

When tunneling client 106 receives the configuration response CM at 409, it releases the TCP transport by sending a configuration release request CM at 410 that is responded by tunneling server 116 with a configuration release response CM at 411.

When tunneling client 106 receives the configuration release response CM at 411, all incoming and outgoing traffic is now sent over UDP transport instead of TCP transport (e.g., frames 3, 4 and 5 at 412-417). Therefore, the encapsulated media, using UDP, bypasses firewalls and other security devices that may be present in restrictive network 114.

In one embodiment, to provide the efficient media traffic transport functionality, the "tsc_tunnel_params" structure of the TSCF SDK is upgraded to include a new boolean parameter "multi_connection" that indicates that connections over the different tunnel transports are to be made near simultaneously, as indicated by the following pseudo-code:

```
typedef struct
{
    tsc_connection_params connection_params[TSC_MAX_CONNECTION_PARAMS];
    .
    .
    .
    uint32_t max_connections;
    .
    .
    .
    tsc_bool multi_connection;
} tsc_tunnel_params;
```

The "connection_params" member in the above pseudo-code defines the list of connection and transport parameters of the servers to which to near simultaneously connect. The "max_connections" member indicates how many of those servers are provided in the list. The "tsc_tunnel_params" structure is passed as a parameter to the "tsc_ctrl_new_tunnel" API upon tunnel creation as follows:

tsc_handle tsc_new_tunnel (tsc_tunnel_params*tunnel_params, tsc_requested_config*requested_config)

where "tsc_handle" is the return code and "requested_config" provides an optional and additional set of configuration parameters.

One embodiment that is implemented using an SBC, such as the Acme Packet 6300 from Oracle Corp., provides a configuration object "tscf-interface" that includes a parameter "assigned-services" that includes a keyword "multi-connection". Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: blank | multi-connection to enable encrypted media detection | Optional |

One embodiment supports efficient encapsulated media traffic transport by expanding TSCF to include a "Tag" TLV value that is used to bind configuration requests over different transports to the configuration request CMs (i.e., at 402 and 403).

Table 1 below provides an example TSCF TLV for providing efficient media traffic transport functionality according to some embodiments.

TABLE 1

| TLV TYPE NAME | VALUE | SEMANTICS | SHORT/LONG FORMAT | VALUE TYPE | LENGTH |
|---|---|---|---|---|---|
| Tag | 50 | Tag Number | Short | 8-bit number | 1 byte |

The following functionality provides an example interface configuration for providing efficient media traffic transport according to one embodiment. At least two TSCF ports are needed to support multiple near simultaneous and consecutive connections:

```
tscf-interface
    realm-id              access
    state                 enabled
    max-tunnels           500
    local-address-pools   pool-1
    assigned-services     SIP,multi-connection
    tscf-port
        address           172.168.1.10
        port              2105
        transport-protocol TCP
        tls-profile
```

```
            rekey-profile
        tscf-port
            address                 172.168.1.10
            port                    2105
            transport-protocol      UDP
            tls-profile
            rekey-profile
```

The following is an example extensible markup language ("XML") functionality for providing efficient encapsulated media traffic transport according to one embodiment:

```
<tscfInterface realmID='access'
    state='enabled'
    maxTunnels='100'
    assignedServices='SIP,multi-connection
    options=''
    lastModifiedBy='admin@console'
    lastModifiedDate='2016-01-01 01:00:00'
    objectId='59'>
    <key>access</key>
    <localAddressPool name='pool-1'/>
    <tscfPort address='172.168.1.10'
        port='2105'
        transProtocol='TCP'
        tlsProfile=''
        rekeyProfile=''/>
    <tscfPort address='172.168.1.10'
        port='2105'
        transProtocol='UDP'
        tlsProfile=''
        rekeyProfile=''/>
</tscfInterface>
```

Figure 5:
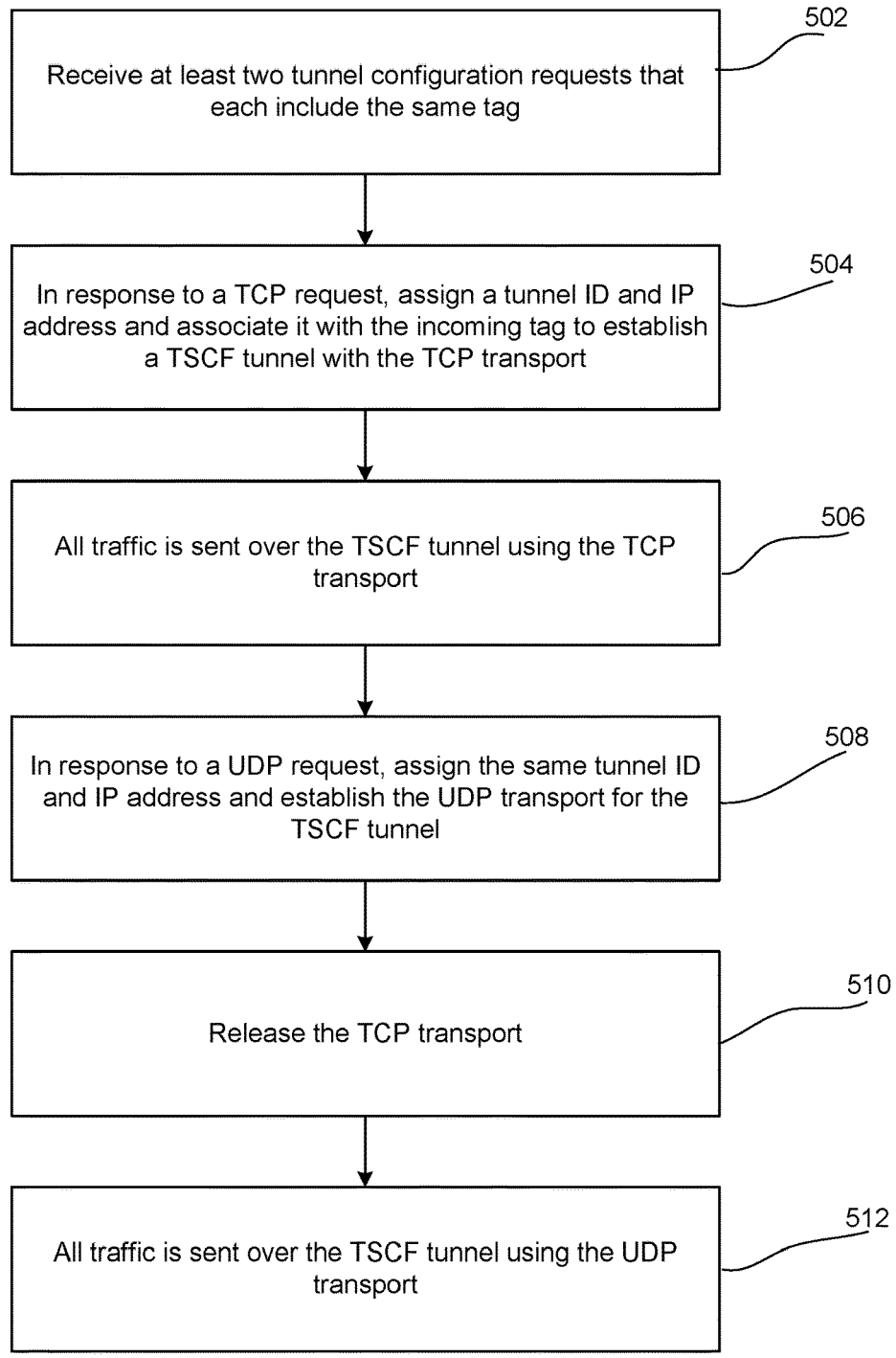
FIG. 5 is a flow diagram of an efficient encapsulated media traffic transport module of FIG. 2 and/or tunneling client and tunneling server of FIG. 1 when performing efficient encapsulated media traffic transport in accordance with embodiments of the present invention.

FIG. 5 is a flow diagram of efficient encapsulated media traffic transport module 16 of FIG. 2 and/or tunneling client 106 and tunneling server 116 of FIG. 1 when performing efficient encapsulated media traffic transport in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502, tunneling client 106 and tunneling server 116 establishes a TSCF tunnel 108 by having tunneling client 106 send out at least two tunnel configurations near simultaneously, by sending the requests out consecutively without any other intervening requests in one embodiment, that are received by tunneling server 116. In one embodiment, one request is for a datagram UDP transport, and one request is for a stream based TCP transport. Each configuration request includes the same tag.

At 504, in response to the stream based TCP transport request, tunneling server 116 assigns a tunnel ID and IP address and associates it with the incoming tag and issues a configuration response, which establishes the tunnel 108.

At 506, all traffic is sent over the TSCF tunnel using TCP transport.

At 508, in response to the datagram UDP transport request, if UDP is not blocked by firewalls, tunneling server 116 assigns the same tunnel ID and IP address as in 504 and issues a configuration response.

At 510, the TCP transport is released if UDP is available. Before the TCP transport is released, traffic can be send over both the TCP and UDP transport layers.

At 512, all traffic is now sent over the TSCF tunnel using UDP transport instead of TCP transport. In one embodiment, the traffic is encapsulated media traffic. Because the UDP traffic is sent via tunnel 108, it bypasses any firewalls, etc. that may be present in restrictive network 114.

In other implementations, in response to the tunnel requests 402, 403, the UDP request may be responded to first by server 116, in which case tunnel 108 is first established with a UDP transport layer. If this occurs, in one embodiment all media traffic is transported over UDP, and the TCP transport is released right away, even if the tunnel negotiation over TCP is still in progress.

As disclosed, embodiments establish a tunnel with both UDP and TSCF transport layers when transmitting encapsulated media. Both transport layers are requested at call setup time, which reduces setup delays and provides for efficient transport. If the UDP transport layer is available (e.g., it can bypass all firewalls), the TSCF transport layer is dropped, and the encapsulated media is sent only on the UDP transport layer.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of transmitting encapsulated media, the method comprising:
    receiving a first request to establish a tunnel with a stream based transport layer, the first request comprising a tag;
    receiving a second request to establish the tunnel with a datagram based transport layer, the second request comprising the tag;
    establishing the tunnel with the stream based transport layer and receiving the encapsulated media over the stream based transport layer;
    establishing the datagram based transport layer for the tunnel in addition to the stream based transport layer and receiving the encapsulated media over the datagram based transport layer; and
    releasing the stream based transport layer.

2. The method of claim 1, wherein the tunnel is established according to a tunneled services control function (TSCF) standard.

3. The method of claim 1, wherein the stream based transport layer transmits the encapsulated media using a transmission control protocol (TCP).

4. The method of claim 1, wherein the datagram based transport layer transmits the encapsulated media using a User Datagram Protocol (UDP).

5. The method of claim 1, wherein establishing the tunnel comprises assigning a tunnel identifier and Internet Protocol address to the tunnel.

6. The method of claim 1, wherein the encapsulated media is transmitted over the stream based transport layer before the datagram based transport layer is established.

7. The method of claim 6, wherein the encapsulated media is transmitted over the datagram based transport layer after the stream based transport layer is released.

8. The method of claim 1, wherein the first request and the second request are received consecutively without any intervening requests.

9. A non-transitory computer readable medium having instructions stored thereon that, when executed by a processor, cause the processor to transmit encapsulated media, the transmitting comprising:
receiving a first request to establish a tunnel with a stream based transport layer, the first request comprising a tag;
receiving a second request to establish the tunnel with a datagram based transport layer, the second request comprising the tag;
establishing the tunnel with the stream based transport layer and receiving the encapsulated media over the stream based transport layer;
establishing the datagram based transport layer for the tunnel in addition to the stream based transport layer and receiving the encapsulated media over the datagram based transport layer; and
releasing the stream based transport layer.

10. The computer readable medium of claim 9, wherein the tunnel is established according to a tunneled services control function (TSCF) standard.

11. The computer readable medium of claim 9, wherein the stream based transport layer transmits the encapsulated media using a transmission control protocol (TCP).

12. The computer readable medium of claim 9, wherein the datagram based transport layer transmits the encapsulated media using a User Datagram Protocol (UDP).

13. The computer readable medium of claim 9, wherein establishing the tunnel comprises assigning a tunnel identifier and Internet Protocol address to the tunnel.

14. The computer readable medium of claim 9, wherein the encapsulated media is transmitted over the stream based transport layer before the datagram based transport layer is established.

15. The computer readable medium of claim 14, wherein the encapsulated media is transmitted over the datagram based transport layer after the stream based transport layer is released.

16. The computer readable medium of claim 9, wherein the first request and the second request are received consecutively without any intervening requests.

17. A tunneling server in communication with a tunneling client for transmitting encapsulated media between the tunneling server and the tunneling client, the tunneling server comprising:
a processor; and
a storage device coupled to the processor that stores instructions that when executed by the processor, implement functionality comprising:
receiving a first request to establish a tunnel with a stream based transport layer, the first request comprising a tag;
receiving a second request to establish the tunnel with a datagram based transport layer, the second request comprising the tag;
establishing the tunnel with the stream based transport layer and receiving the encapsulated media over the stream based transport layer;
establishing the datagram based transport layer for the tunnel in addition to the stream based transport layer and receiving the encapsulated media over the datagram based transport layer; and
releasing the stream based transport layer.

18. The tunneling server of claim 17, wherein the tunnel is established according to a tunneled services control function (TSCF) standard.

19. The tunneling server of claim 17, wherein the stream based transport layer transmits the encapsulated media using a transmission control protocol (TCP).

20. The tunneling server of claim 17, wherein the datagram based transport layer transmits the encapsulated media using a User Datagram Protocol (UDP).

* * * * *